US011999560B2

(12) United States Patent
Foster

(10) Patent No.: US 11,999,560 B2
(45) Date of Patent: Jun. 4, 2024

(54) ROLL OUT CART

(71) Applicant: Rehrig Pacific Company, Los Angeles, CA (US)

(72) Inventor: Derick Foster, Cumming, GA (US)

(73) Assignee: Rehrig Pacific Company, Los Angeles, CA (US)

(*) Notice: Subject to any disclaimer, the term of this patent is extended or adjusted under 35 U.S.C. 154(b) by 189 days.

(21) Appl. No.: 17/183,483

(22) Filed: Feb. 24, 2021

(65) Prior Publication Data

US 2021/0179349 A1    Jun. 17, 2021

Related U.S. Application Data

(63) Continuation of application No. 15/810,422, filed on Nov. 13, 2017, now Pat. No. 10,954,063.

(Continued)

(51) Int. Cl.
| | | |
|---|---|---|
| *B29C 51/12* | (2006.01) | |
| *B29C 51/10* | (2006.01) | |
| *B65F 1/02* | (2006.01) | |
| *B65F 1/12* | (2006.01) | |
| *B65F 1/14* | (2006.01) | |
| *B65F 1/16* | (2006.01) | |
| *B29L 31/56* | (2006.01) | |

(52) U.S. Cl.
CPC .......... *B65F 1/1615* (2013.01); *B29C 51/105* (2013.01); *B29C 51/12* (2013.01); *B65F 1/02* (2013.01); *B65F 1/122* (2013.01); *B65F 1/1473* (2013.01); *B65F 1/1484* (2013.01); *B65F 1/16* (2013.01); *B65F 1/1646* (2013.01); *B29L 2031/565* (2013.01); *B65F 2210/138* (2013.01); *B65F 2250/114* (2013.01)

(58) Field of Classification Search
CPC .... B29L 2031/565; B65F 1/02; B65F 1/1473; B65F 1/1484; B65F 1/16; B65F 1/1615; B65F 2210/138; B65F 2250/114; B65F 1/12; B65F 1/122; B65F 1/14; B65F 1/1468; B65F 1/1646; B65F 2001/1653; B65F 2250/1143; B65F 2250/1146; Y02P 70/10; Y02P 70/12; B29C 51/10; B29C 51/105; B29C 51/12; B29C 65/48
See application file for complete search history.

(56) References Cited

U.S. PATENT DOCUMENTS

| | | | | |
|---|---|---|---|---|
| 5,088,616 A * | 2/1992 | Susko | ........................ | B65F 1/16 |
| | | | | 220/908 |
| 5,147,055 A * | 9/1992 | Samson | .................... | B65F 7/00 |
| | | | | 220/252 |

(Continued)

*Primary Examiner* — Michael A Tolin
(74) *Attorney, Agent, or Firm* — Carlson, Gaskey & Olds, P.C.

(57) ABSTRACT

A container, such as a roll-out cart, includes a body portion and a lid. The body portion includes an outer wall extending upward from a base wall to a mouth of the body portion. The lid is secured to the body portion and pivotable between a closed position over the mouth and an open position. The lid includes an upper lid portion and a lower lid portion. The upper lid portion extends downward to an outer lip. The lower lid portion extends downward to an inner lip. The inner lip is inward of the outer wall of the body portion when the lid is in the closed position. The outer lip is outward of the outer wall of the body when the lid is in the closed position.

26 Claims, 22 Drawing Sheets

Related U.S. Application Data

(60) Provisional application No. 62/560,486, filed on Sep. 19, 2017, provisional application No. 62/537,500, filed on Jul. 27, 2017, provisional application No. 62/421,197, filed on Nov. 11, 2016.

(56) References Cited

U.S. PATENT DOCUMENTS

| | | | |
|---|---|---|---|
| 5,165,564 A | 11/1992 | Prout et al. | |
| 6,943,678 B2 * | 9/2005 | Muirhead | B29C 51/12 |
| | | | 340/572.8 |
| 2003/0213808 A1 * | 11/2003 | Berger | B65F 1/1646 |
| | | | 206/505 |
| 2013/0316111 A1 * | 11/2013 | Wu | C08L 47/00 |
| | | | 428/36.9 |
| 2015/0100428 A1 * | 4/2015 | Parkinson, Jr. | G06Q 30/0267 |
| | | | 705/28 |

* cited by examiner

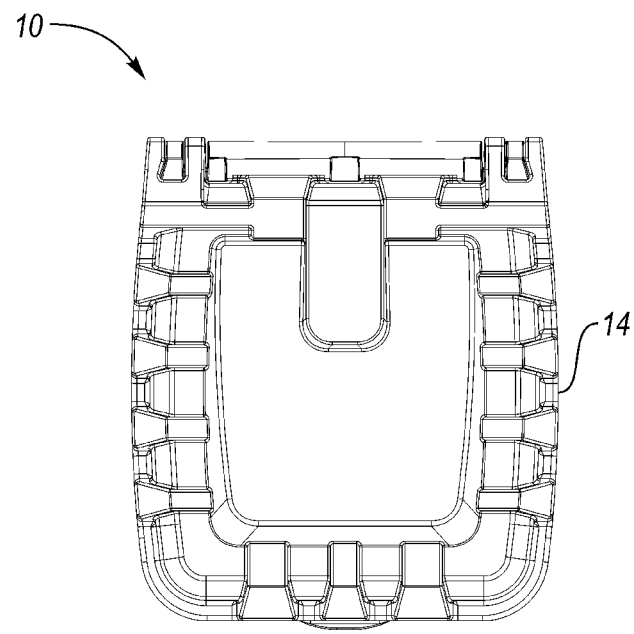
FIG. 2
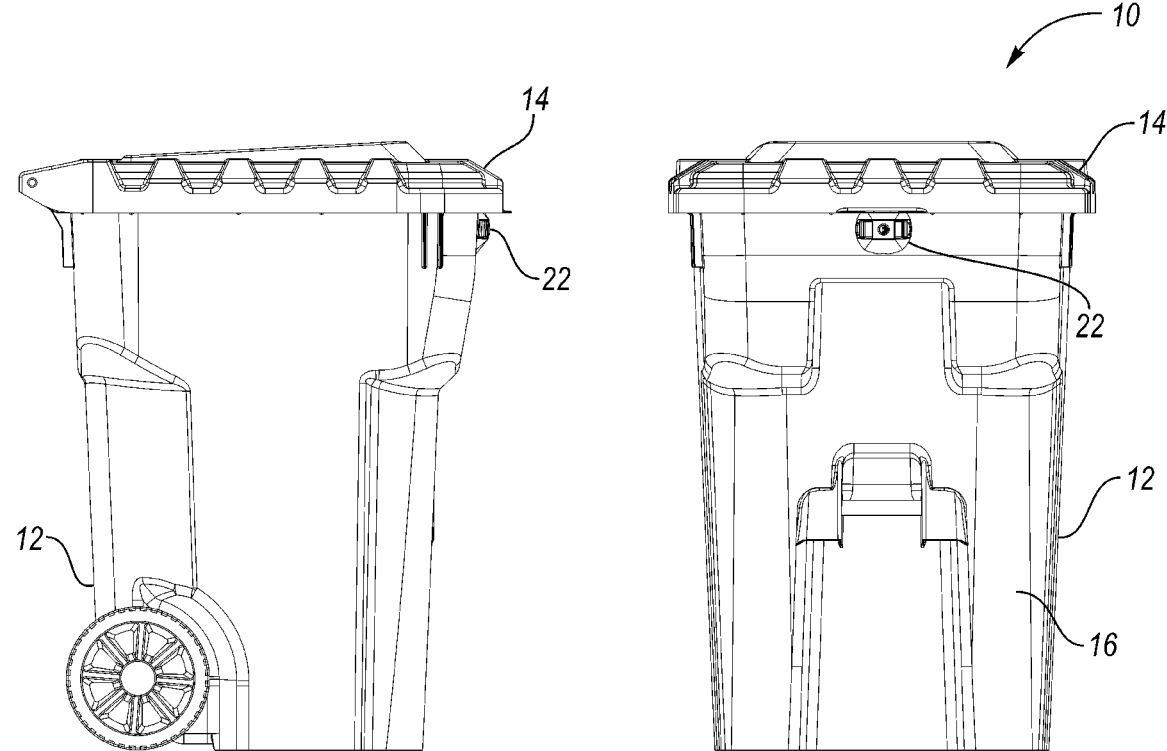
FIG. 4
FIG. 3

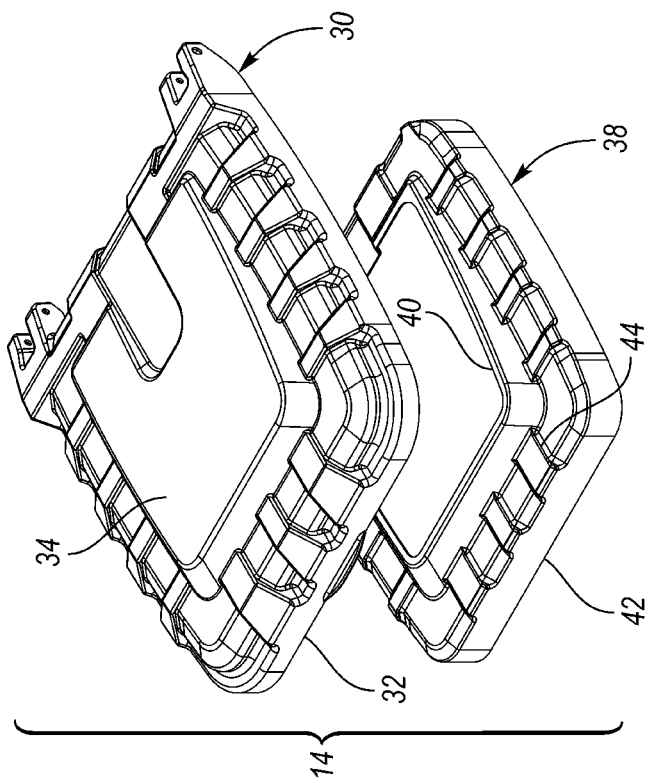
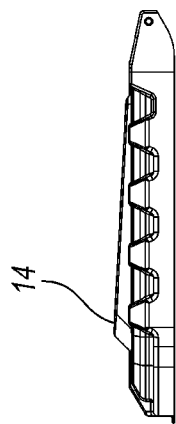
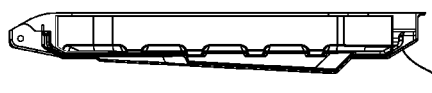
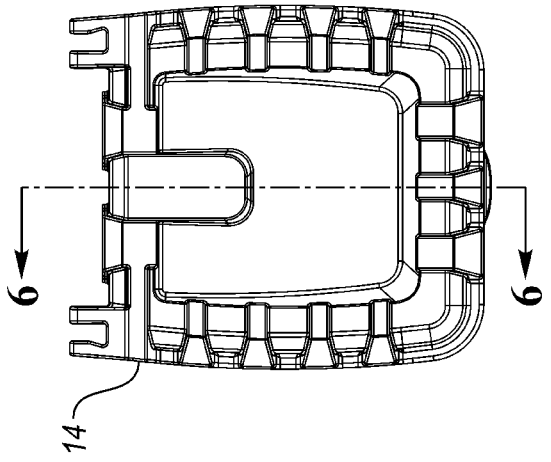
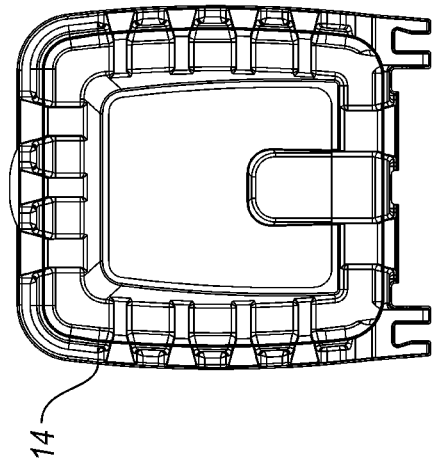

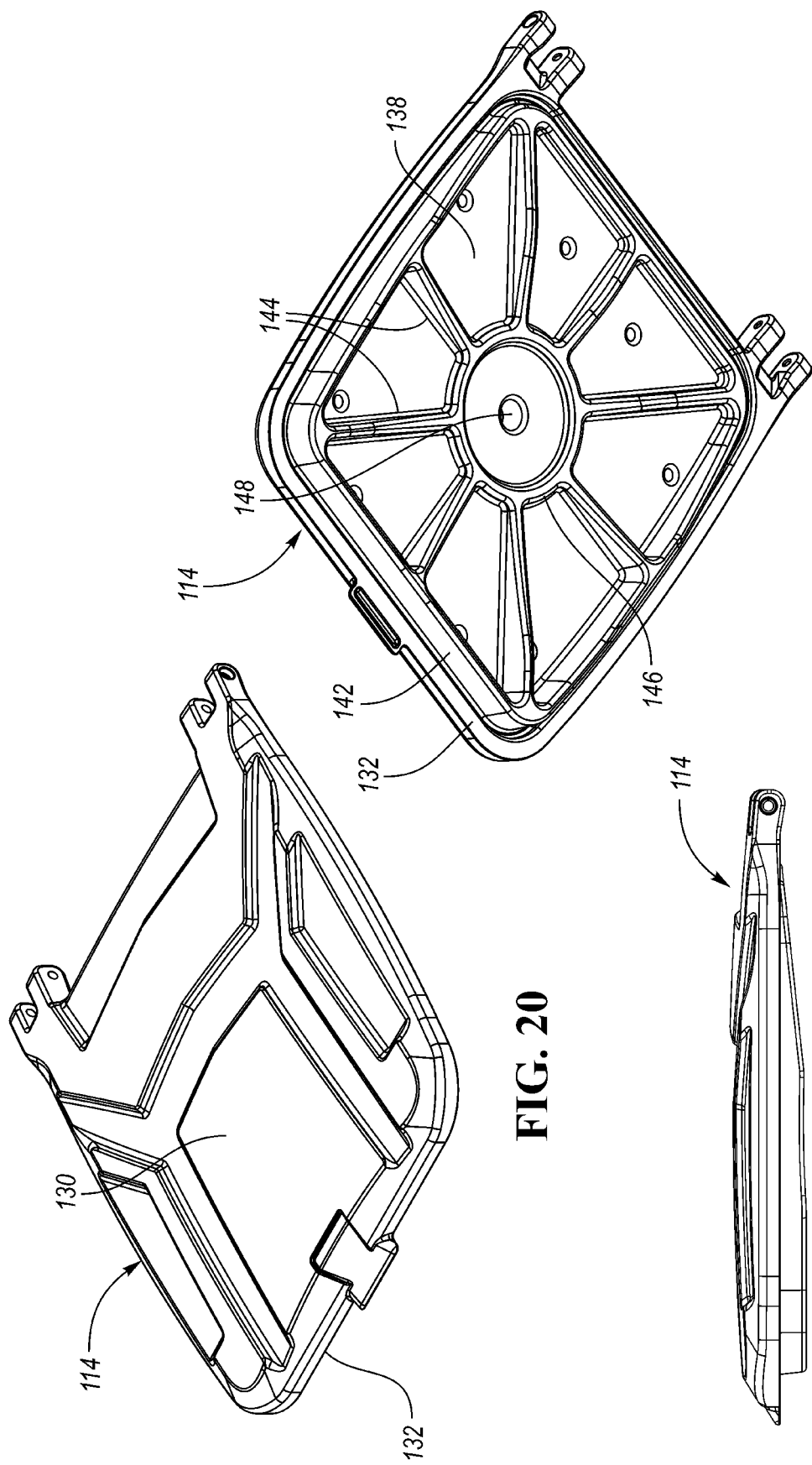

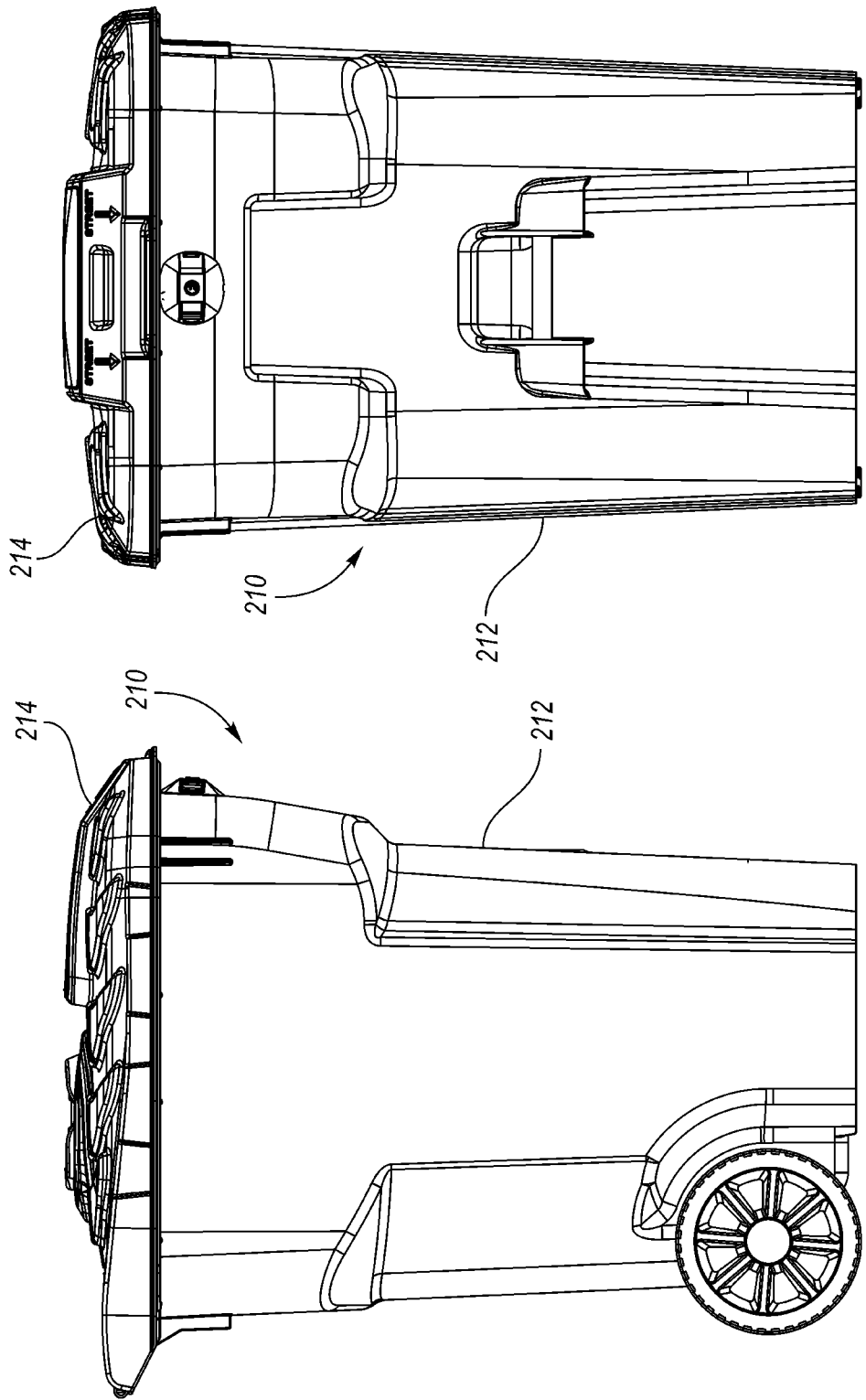

ROLL OUT CART

BACKGROUND

Containers for trash, recycling, or organic waste (compost), etc. often attract the interest of animals, such as rodents, dogs, raccoons, etc. Many containers include lids that latch, but some animals can pry under the lid and force the container open. In some areas, bears may try to force the container open.

SUMMARY

A container, such as a roll-out cart, includes a body portion and a lid. The body portion includes an outer wall extending upward from a base wall to a mouth of the body portion. The lid is secured to the body portion and pivotable between a closed position over the mouth and an open position. The lid includes an upper lid portion and a lower lid portion. The upper lid portion extends downward to an outer lip. The lower lid portion extends downward to an inner lip. The inner lip is inward of the outer wall of the body portion when the lid is in the closed position. The outer lip is outward of the outer wall of the body when the lid is in the closed position.

The lid may be thermoformed or rotomolded. An RFID tag may be secured between the upper lid portion and the lower lid portion.

The upper lid portion protects the interior of the body portion. The outer lip of the upper lid portion fits tightly around the outer perimeter of the upper portion of the wall of the body portion including the lip when the lid is closed. The tight fit makes it challenging for the bear to get its claws in-between the lid and the body portion. The lower lid portion is attached to the upper lid portion on the interior of the lid. The lower lid portion creates an added layer of protection to the lid improving the overall strength. The lower lid portion also acts as a second barrier if the bear tries to pry the lid open. When a bear pulls on the outer lip, the inner lip is pushed up against the interior of the wall and blocks off the entry point of the container.

According to another feature disclosed herein, the body portion may further include a lip projecting outward and downward from the outer wall. A reinforcement member may be received between the lip and the outer wall of the body portion. A plurality of ribs may extend from the outer wall to the lip, and the reinforcement member may be received in a plurality of apertures through the plurality of ribs. The body portion may further include a handle portion spaced rearwardly of an upper edge of the outer wall of the body portion, and the lid may be pivotably connected to the handle portion. An upper edge of the outer wall of the body portion includes a rear portion from which the handle portion extends and a pair of side portions extending forward from the rear portion The reinforcement member may be a first reinforcement member received between the lip and the outer wall along one of the side portions.

BRIEF DESCRIPTION OF THE DRAWINGS

FIG. 2 is a top view of the container of FIG. 1.
FIG. 3 is a front view of the container of FIG. 1.
FIG. 4 is a side view of the container of FIG. 1.
FIG. 5 is a top view of the lid of the container of FIG. 1.
FIG. 6 is a section view of the lid of FIG. 5 taken along line 6-6 of FIG. 5.
FIG. 7 is a bottom view of the lid of FIG. 5.
FIG. 8 is a side view of the lid of FIG. 5.
FIG. 9 is an exploded perspective view of the lid of FIG. 5.
FIG. 19 is a side view of the lid of FIG. 16.
FIG. 20 is an upper perspective view of the lid of FIG. 16.
FIG. 21 is a bottom perspective view of the lid of FIG. 16.
FIG. 26 is a top view of the roll-out cart of FIG. 24.
FIG. 27 is a front view of the roll-out cart of FIG. 24.

DETAILED DESCRIPTION OF PREFERRED EMBODIMENTS

Figure 1:
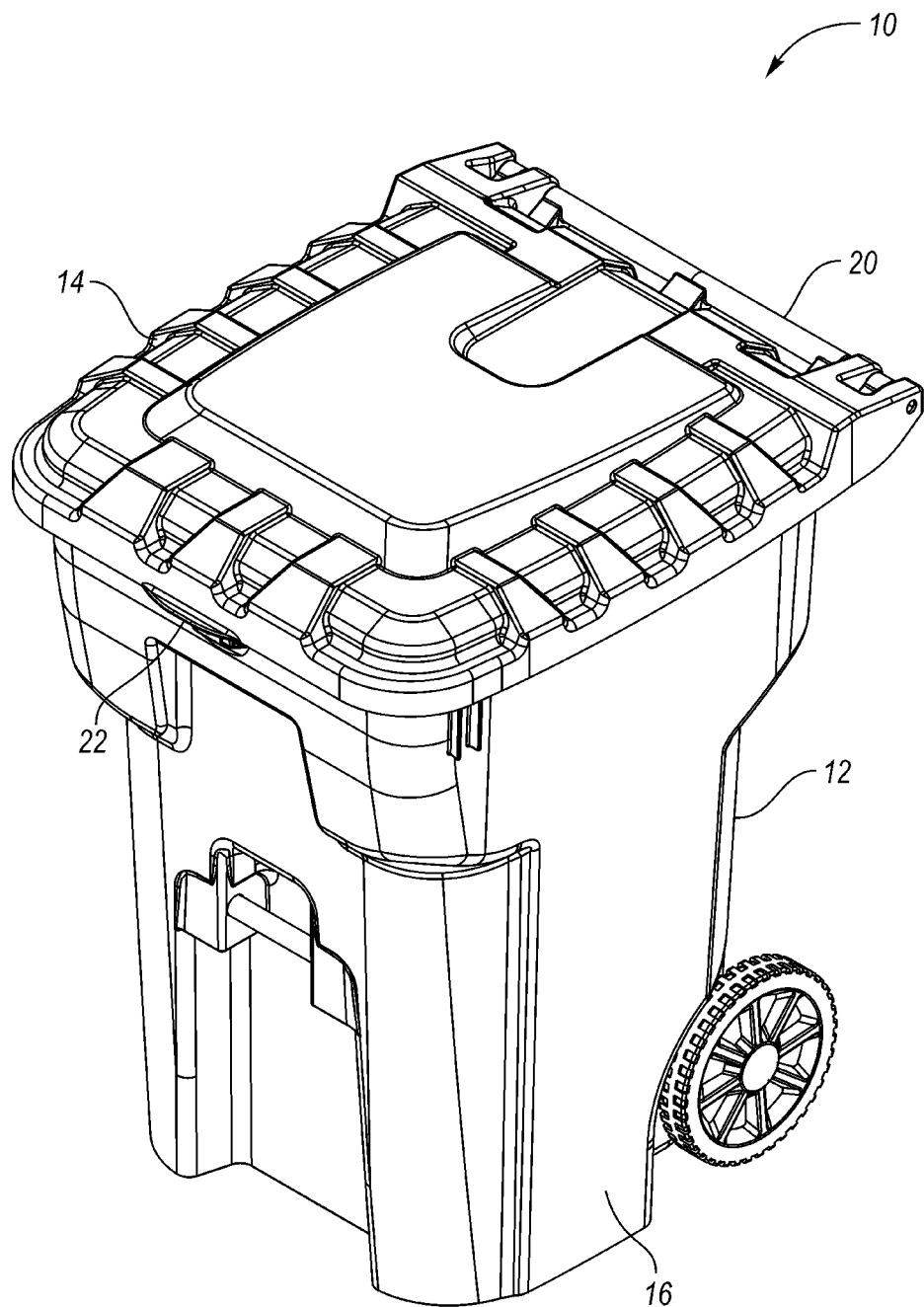
FIG. 1 is a perspective view of a roll-out cart according to a first embodiment.

A container 10, more specifically a roll out container 10, is shown in FIG. 1. The container 10 includes a body portion 12 and a lid 14. The body portion 12 includes an outer wall 16 extending upward from a base wall to a mouth of the body portion 12 which is selectively covered by the lid 14. An upper edge of the body portion 12 includes a lip projecting outward and then downward. The lid 14 is hingeably connected to a handle portion 20 spaced rearwardly of an upper edge of the body portion 12. The container 10 includes a latch 22 selectively securing the body portion 12 to the lid 14 at a front edge of the container 10, i.e. opposite the handle portion 20. The latch 22 may be a gravity latch that automatically releases the lid 14 from the body portion 12 when the container 10 is inverted, such as by a lift arm on a collection truck.

FIG. 2 is a top view of the container 10. FIG. 3 is a front view. FIG. 4 is a side view.

FIGS. 5-8 show top, section, bottom, and side views of the lid 14, respectively. As shown in FIG. 9, the lid 14 is initially formed in two pieces, upper lid portion 30 and lower lid portion 38. The upper lid portion 30 and lower lid portion 38 may be thermoformed and subsequently joined or joined during thermoforming, but are shown in an exploded view in FIG. 9. The upper lid portion 30 includes an outer lip 32 extending downward from a periphery of an upper panel portion 34. The lower lid portion 38 includes an inner lip 42 extending downward from a periphery of a lower panel portion 44 having a large upper planar portion 40.

Figure 10:
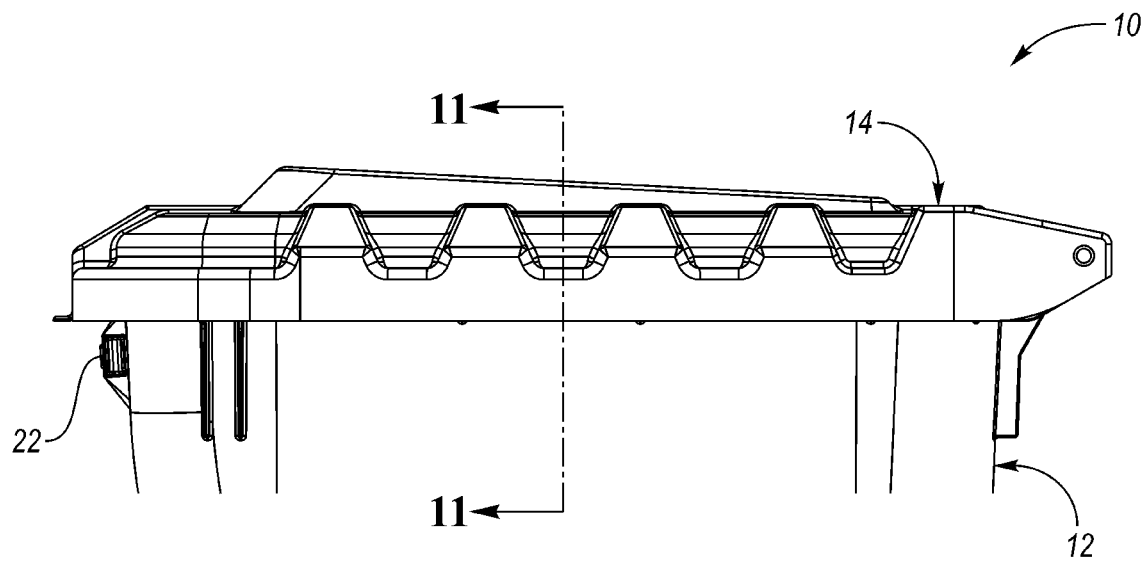
FIG. 10 is a side view of the upper portion of the roll-out cart of FIG. 1.
Figure 11:
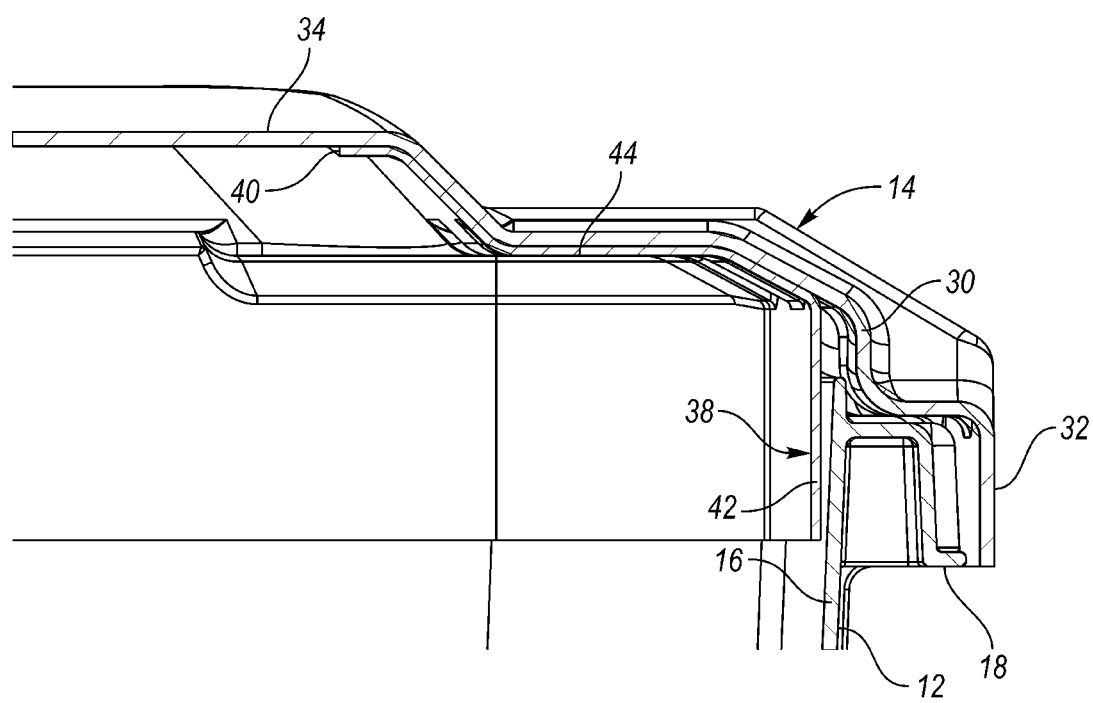
FIG. 11 is a section view taken along line 11-11 of FIG. 10.

FIG. 10 is a side view of the container 10. FIG. 11 is a section view taken along line 11-11 of FIG. 10. As shown in FIG. 11, the upper lid portion 30 and lower lid portion 38 are joined (e.g. via adhesive, welding, fasteners, thermoforming, etc) to one another. The upper lid portion 30 and lower lid portion 38 diverge near the outer lip 32 and the inner lip 42 so that the outer lip 32 and the inner lip 42 are spaced apart to receive the upper end of the wall 16 of the body portion 12 and the lip 18 of the body portion 12 therebetween when the lid 14 is closed. The outer lip 32 extends downward to contact the upper surface of the lip 18 and then extends outward and then downward over the outside of the lip 18. The inner lip 42 extends downward along the inside of the upper portion of the wall 16 of the body portion 12.

The upper lid portion 30 protects the interior of the body portion 12. The outer lip 32 of the upper lid portion 30 fits tightly around the outer perimeter of the upper portion of the wall 16 of the body portion 12 including the lip 18 when the lid 14 is closed. The tight fit makes it challenging for the bear to get its claws in-between the lid 14 and the body portion 12. The lower lid portion 38 is attached to the upper lid portion 30 on the interior of the lid 14. The lower lid portion 38 creates an added layer of protection to the lid 14 improving the overall strength. The lower lid portion 38 also acts as a second barrier if the bear tries to pry the lid 14 open. When a bear pulls on the outer lip 32, the inner lip 42 is pushed up against the interior of the wall 16 and blocks off the entry point of the container 10.

Figure 12:
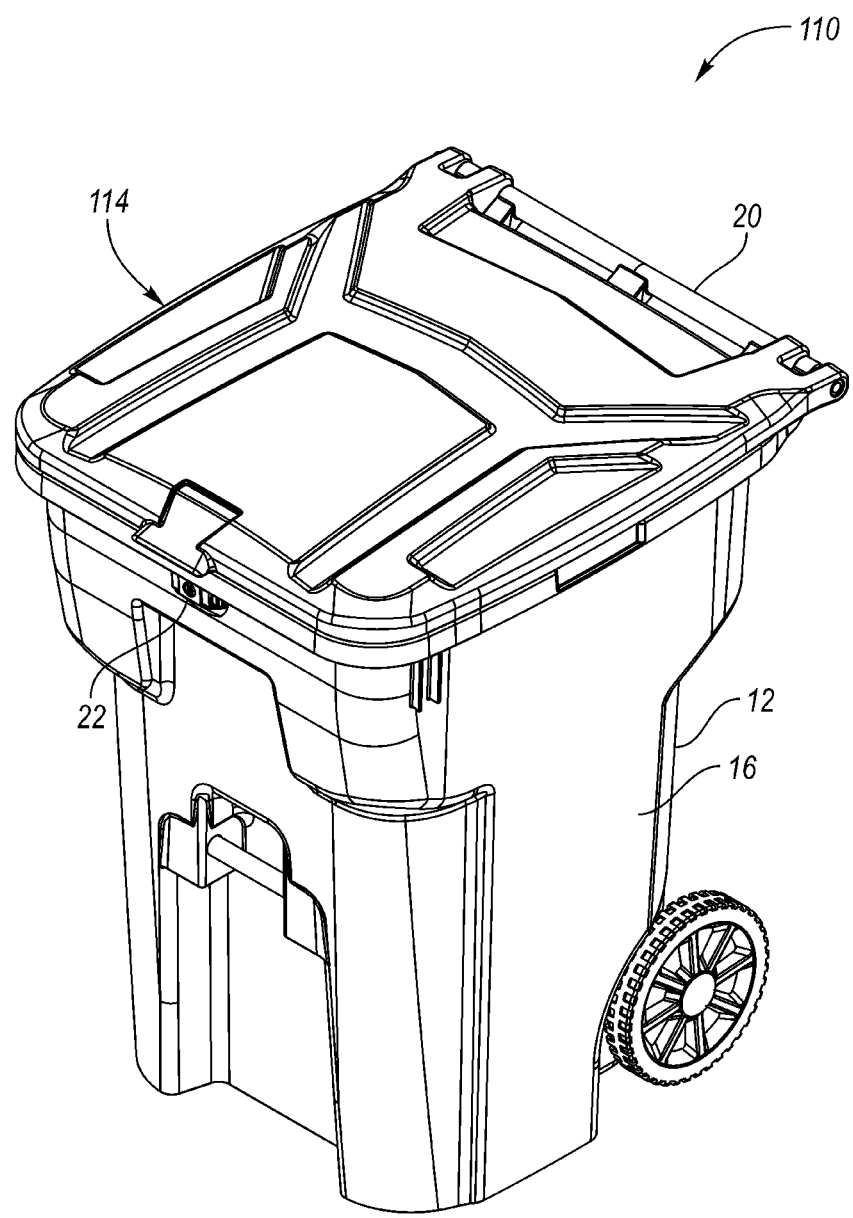
FIG. 12 is a perspective view of a roll-out cart according to a second embodiment.

FIG. 12 shows a second embodiment of a container 110, including the body portion 12 previously described with handle 20 and latch 22, but with an alternate lid 114. The alternate lid 114 is rotationally molded (or rotomolded) but has features similar to that of the first embodiment.

Figure 14:
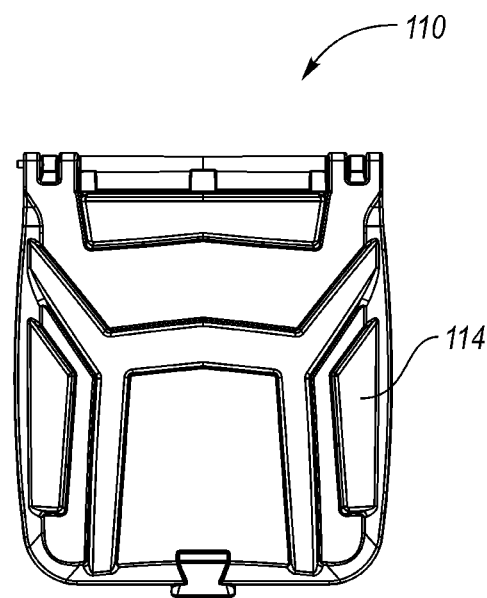
FIG. 14 is a top view of the roll-out cart of FIG. 12.
Figure 13:
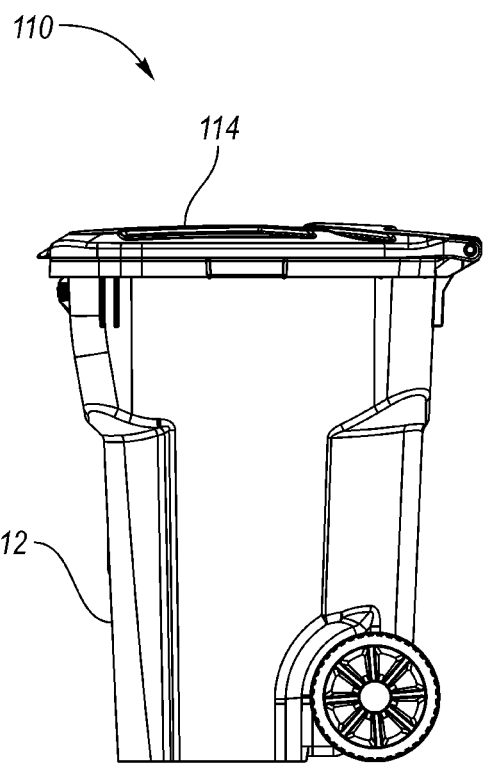
FIG. 13 is a side view of the roll-out cart of FIG. 12.
Figure 15:
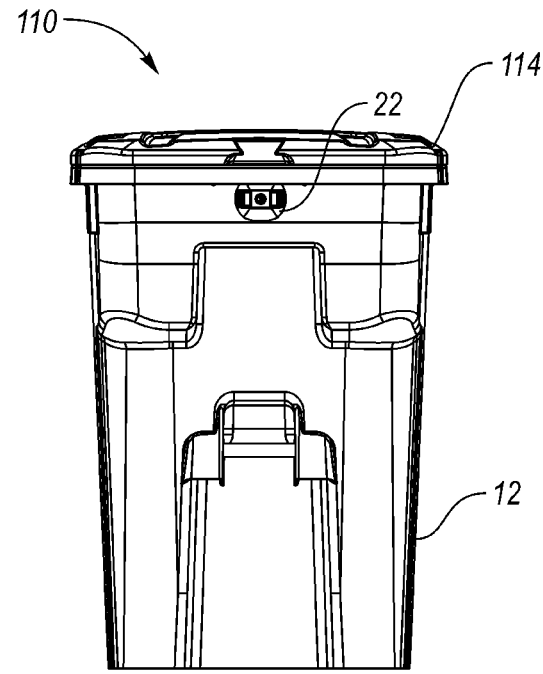
FIG. 15 is a front view of the roll-out cart of FIG. 12.

FIGS. 13-15 are side, top and front view of the container 110, respectively.

Figure 17:
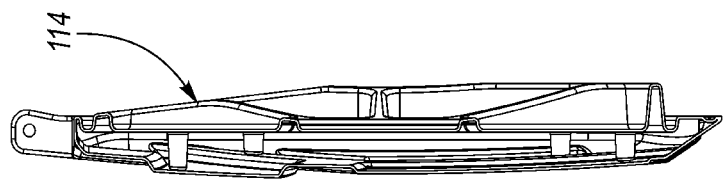
FIG. 17 is a section view through the lid taken along line 17-17 of FIG. 16.
Figure 18:
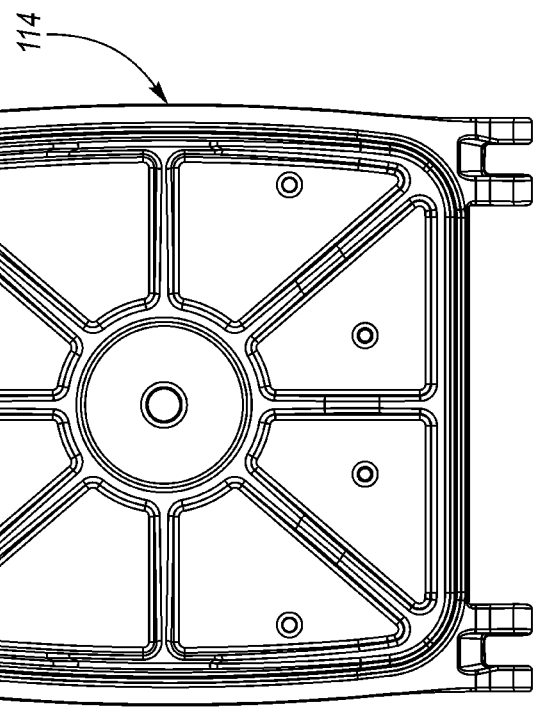
FIG. 18 is a bottom view of the lid of FIG. 16.
Figure 16:
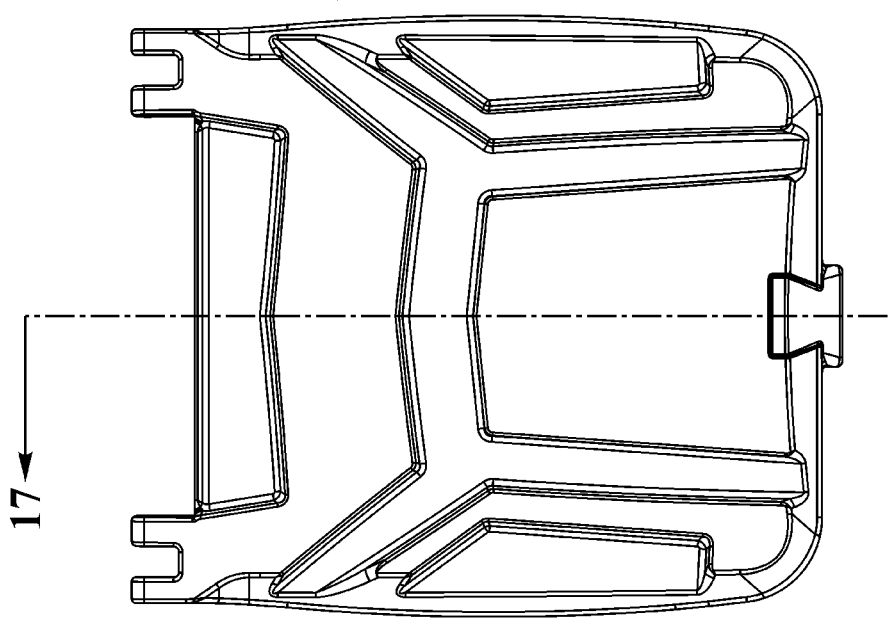
FIG. 16 is a top view of the lid of the roll-out cart of FIG. 12.

FIG. 16 is a top view of the lid 114. FIG. 17 is a section view through the lid 114 taken along line 17-17 of FIG. 16. FIG. 18 is a bottom view of the lid 114. FIG. 19 is a side view of the lid 114.

FIG. 20 is an upper perspective view of the lid 114. The lid 114 includes an upper wall portion 130 having an outer lip 132 extending downward from a periphery thereof. FIG. 21 shows a bottom perspective view of the lid 114. The lid 114 includes a lower wall portion 138 having an inner lip 142 extending downward from a periphery, and spaced inward from the lip 132. A plurality of radial ridges 144 reinforce the lower wall portion 138. The radial ridges 144 radiate outward of an annular ridge 146. Inside the annular ridge 146 a cylindrical rib 148 extends to the upper wall portion 130 of the lid 14.

Figure 22:
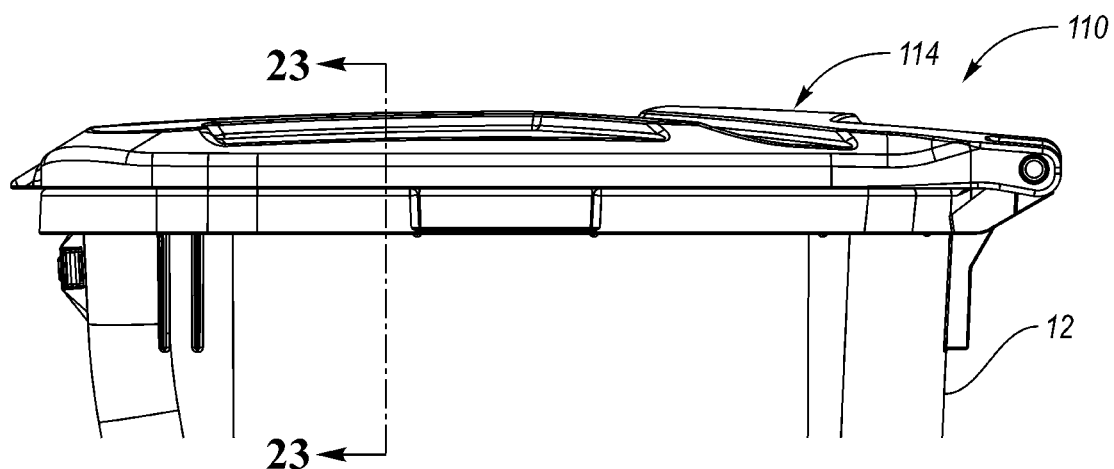
FIG. 22 is a side view of an upper portion of the roll-out cart of FIG. 12.
Figure 23:
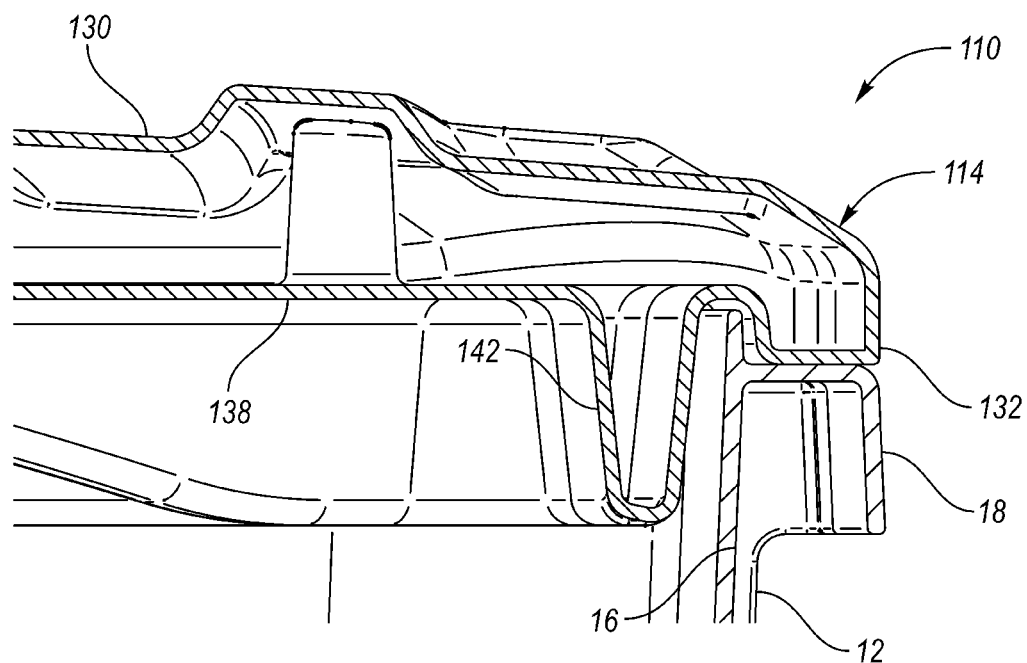
FIG. 23 is a section view taken along line 23-23 of FIG. 22.

FIG. 22 is a side view of the container 110. FIG. 23 is a section view through the container 110 of FIG. 22. As shown, the lid 114 is a hollow, rotomolded single piece of plastic. The outer lip 132 is double-walled or hollow and is spaced outward of the inner lip 142, which is also double-walled or hollow, due to the rotomolding process. When the lid 114 is closed, the outer lip 132 contacts the upper surface of the lip 18 and the inner lip 142 is inward of the wall 16 of the body portion. If a bear tries to pry under the outer lip 132 of the lid 114, this will cause the inner lip 142 to impinge upon the inner surface of the wall 16 of the body portion 12, thereby blocking access to the interior of the container 110.

Figure 24:
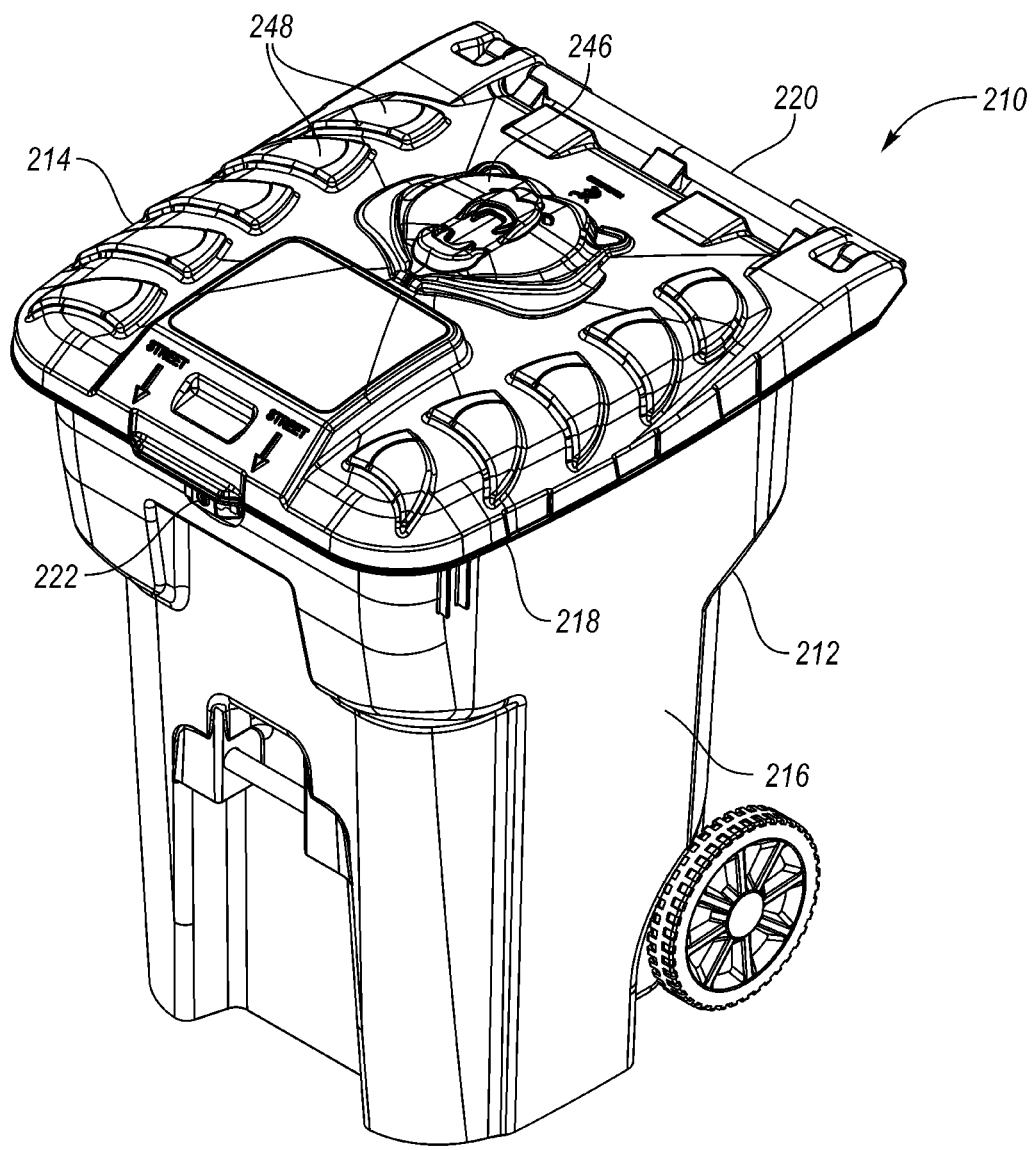
FIG. 24 is a perspective view of a roll-out cart according to a third embodiment.

A container 210, more specifically a roll out container 210, according to a third embodiment is shown in FIG. 24. The container 210 includes a body portion 212 similar to that described above except as described below or as shown in the drawings. The container 210 also includes an alternative lid 214. The body portion 212 includes an outer wall 216 extending upward from a base wall to a mouth of the body portion 212 which is selectively covered by the lid 214. An upper edge of the body portion 212 includes a lip 218 projecting outward and then downward. The lid 214 is hingeably connected to a handle portion 220 spaced rearwardly of an upper edge of the body portion 212. An upper surface of the lid 214 may include a molded-in logo 246, such as an image of the face of a bear, and a plurality of molded-in logos 248 about the periphery of the lid 214, such as bear claws. The container 210 includes a latch 222 selectively securing the body portion 212 to the lid 214 at a front edge of the container 210, i.e. opposite the handle portion 220. The latch 222 may be a gravity latch that automatically releases the lid 214 from the body portion 212 when the container 210 is inverted, such as by a lift arm on a collection truck.

Figure 25:
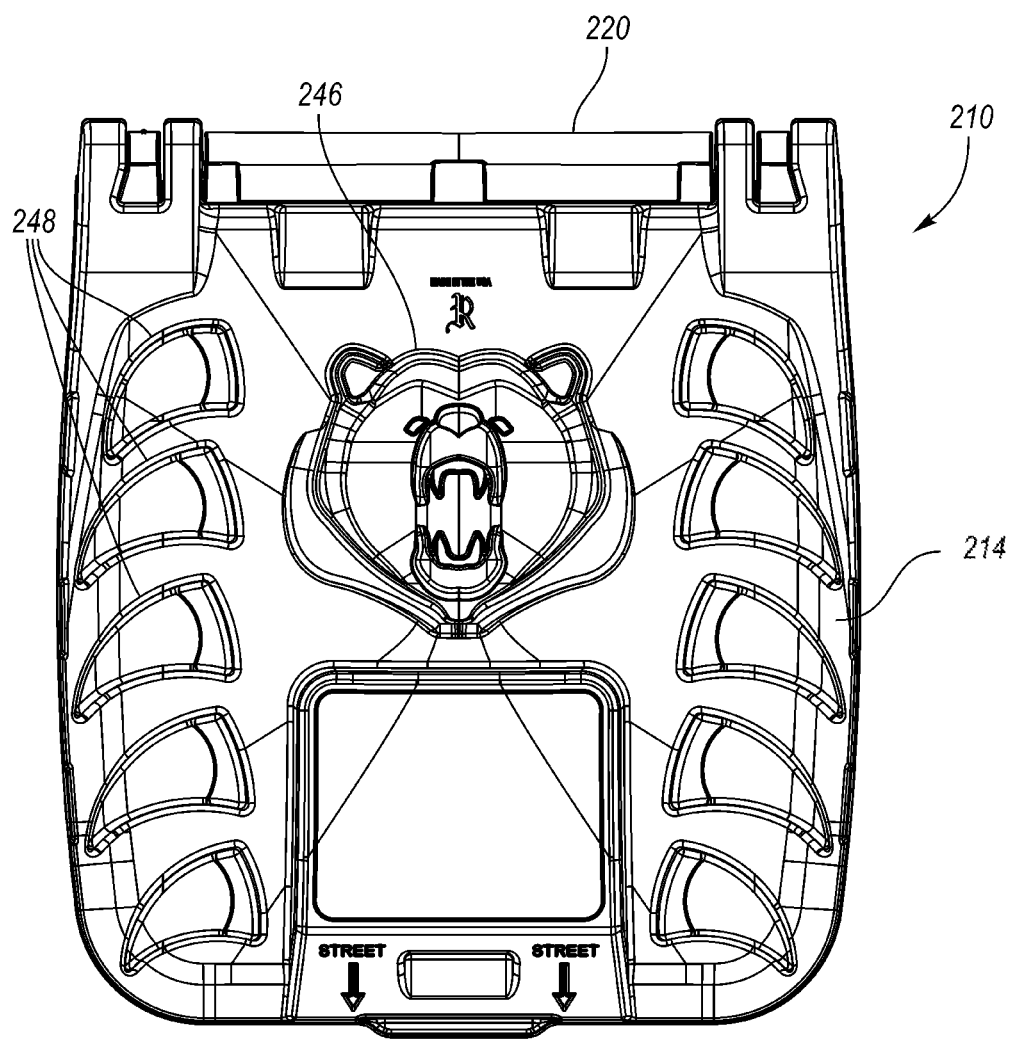
FIG. 25 is a side view of the roll-out cart of FIG. 24.

FIG. 25 is a top view of the container 210. FIG. 26 is a front view. FIG. 27 is a side view.

Figure 28:
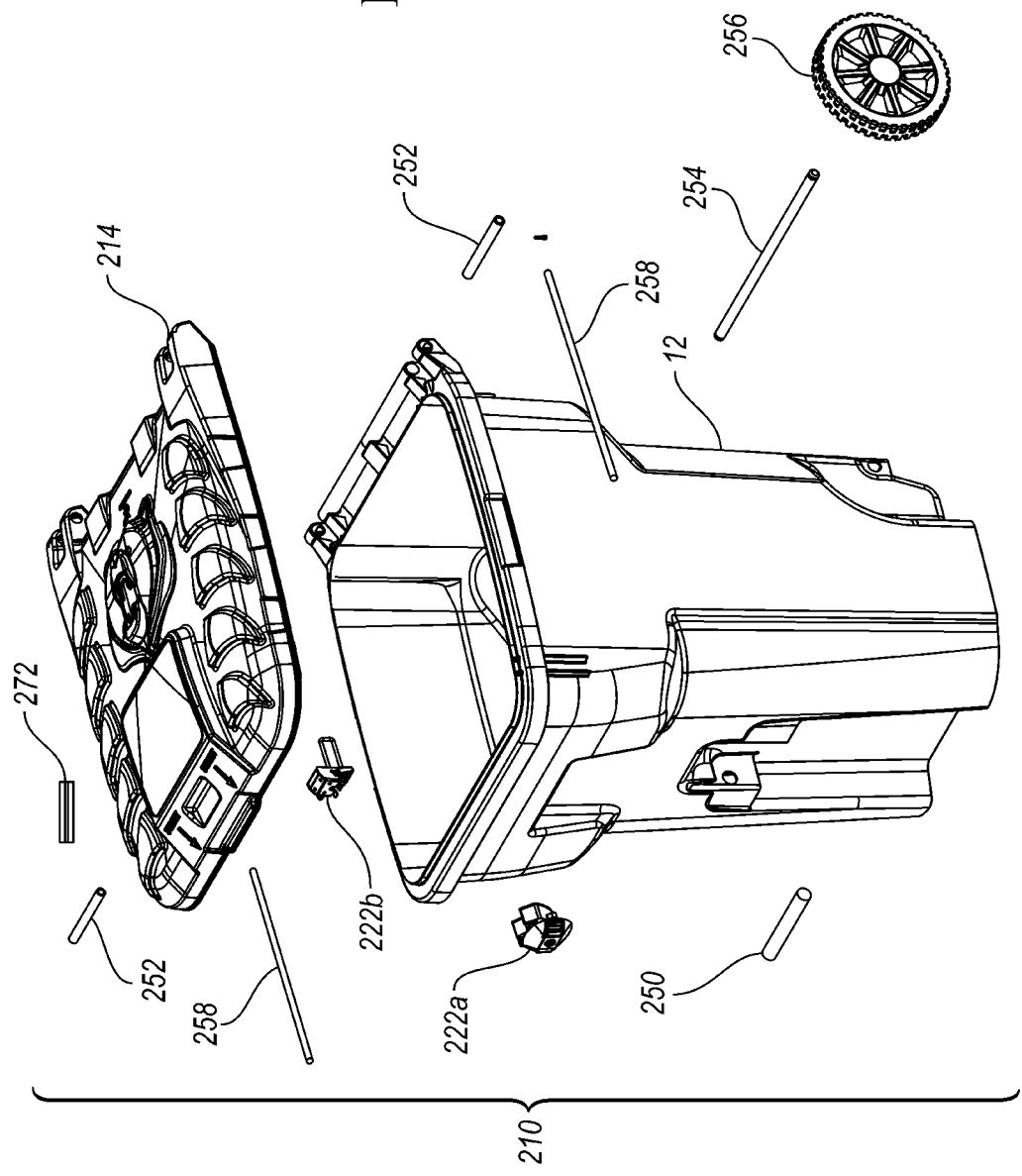
FIG. 28 is an exploded view of the roll-out cart of FIG. 24.

FIG. 28 is an exploded view of the container 210. The latch 222 includes a lower portion 222a secured to the body portion 212 and an upper portion 222b secured to the lid 214. A grab bar 250 is secured to the front of the body portion 212. Hinge pins 252 secure the lid 214 to the handle portion 220 of the body portion 212. An axle 254 rotatably secures the wheels 256) to the body portion 212. Reinforcement rods 258 are received in the lip 218 at the sides of the body portion 212. An optional RFID tag 272 may be mounted on or inside the lid 214.

Figure 29:
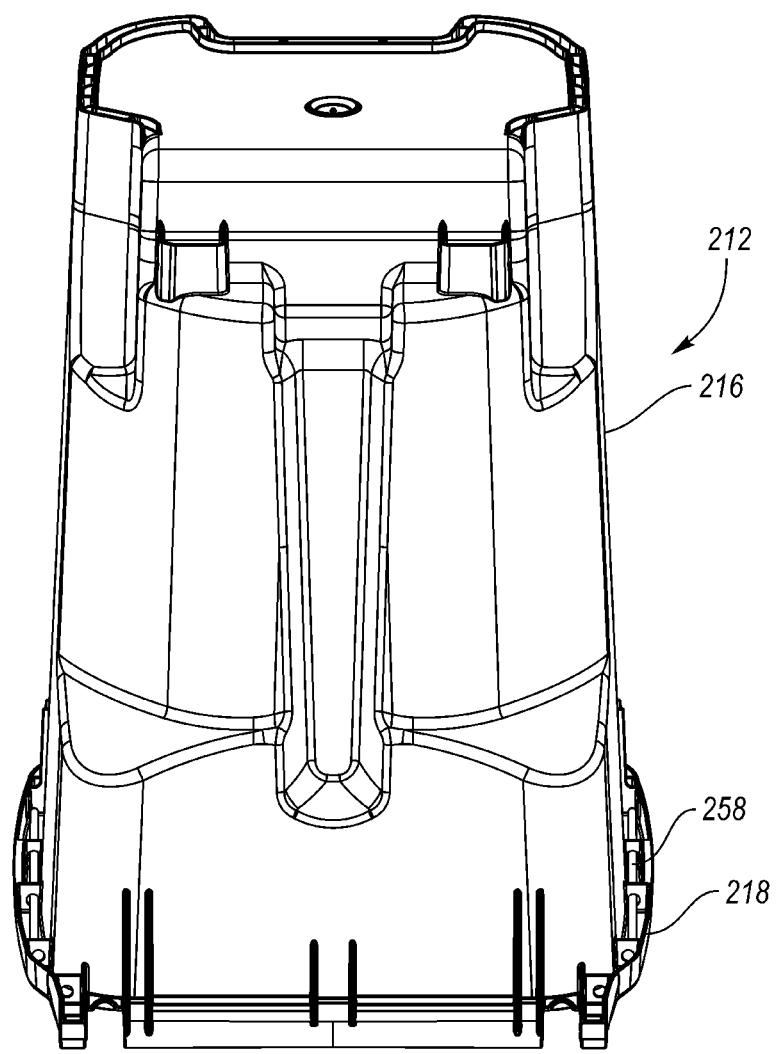
FIG. 29 is a bottom, rear perspective view of the body portion of the roll-out cart of FIG. 24.
Figure 30:
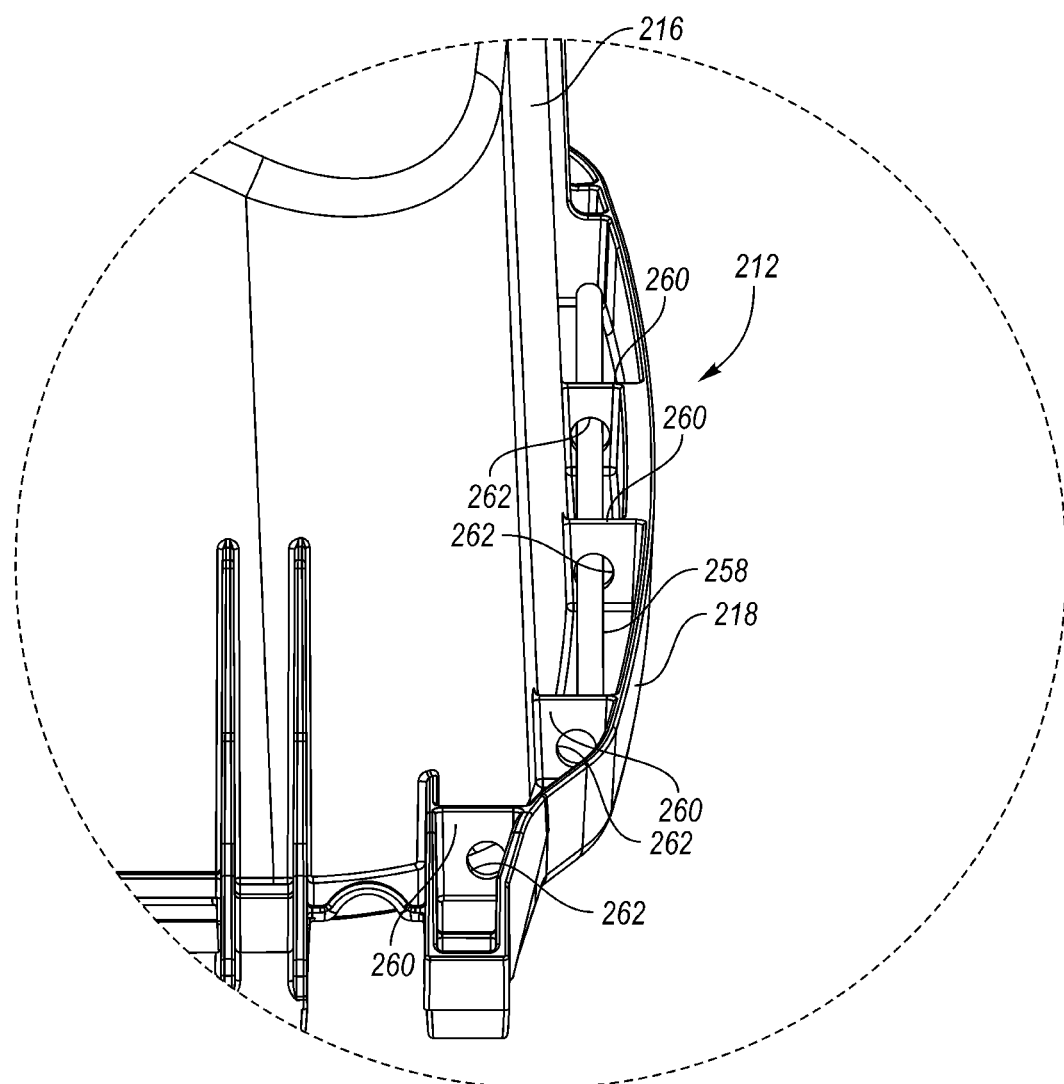
FIG. 30 is an enlarged view of a portion of FIG. 29.

FIG. 29 is a bottom, rear perspective view of the body portion 212. FIG. 30 is an enlarged view of a portion of FIG. 29, showing the underside of the lip 218 at one side of the body portion 212. A plurality of ribs 260 extend from the side wall 216 to the lip 218. An aperture is formed through each rib 260 so that the reinforcement rod 258 can be inserted into the apertures 262. The reinforcement rod 258 can be inserted from the rear of the body portion 212 through the rearward-most aperture 262 and into the ribs 260 connecting the lip 218 to the side of the body portion 212. The reinforcement rods 258 are preferably metal rods 258 installed without any attachment hardware by sliding them in from the back of the body portion 212. The reinforcement rods 258 add support to the body portion 212 to keep it from flexing or bending when an animal presses the side wall 216 inward. This feature adds strength to the overall design without jeopardizing the structural integrity of the body portion 212 design. A similar reinforcement rod may be added to the front edge of the body portion 212.

Figure 31:
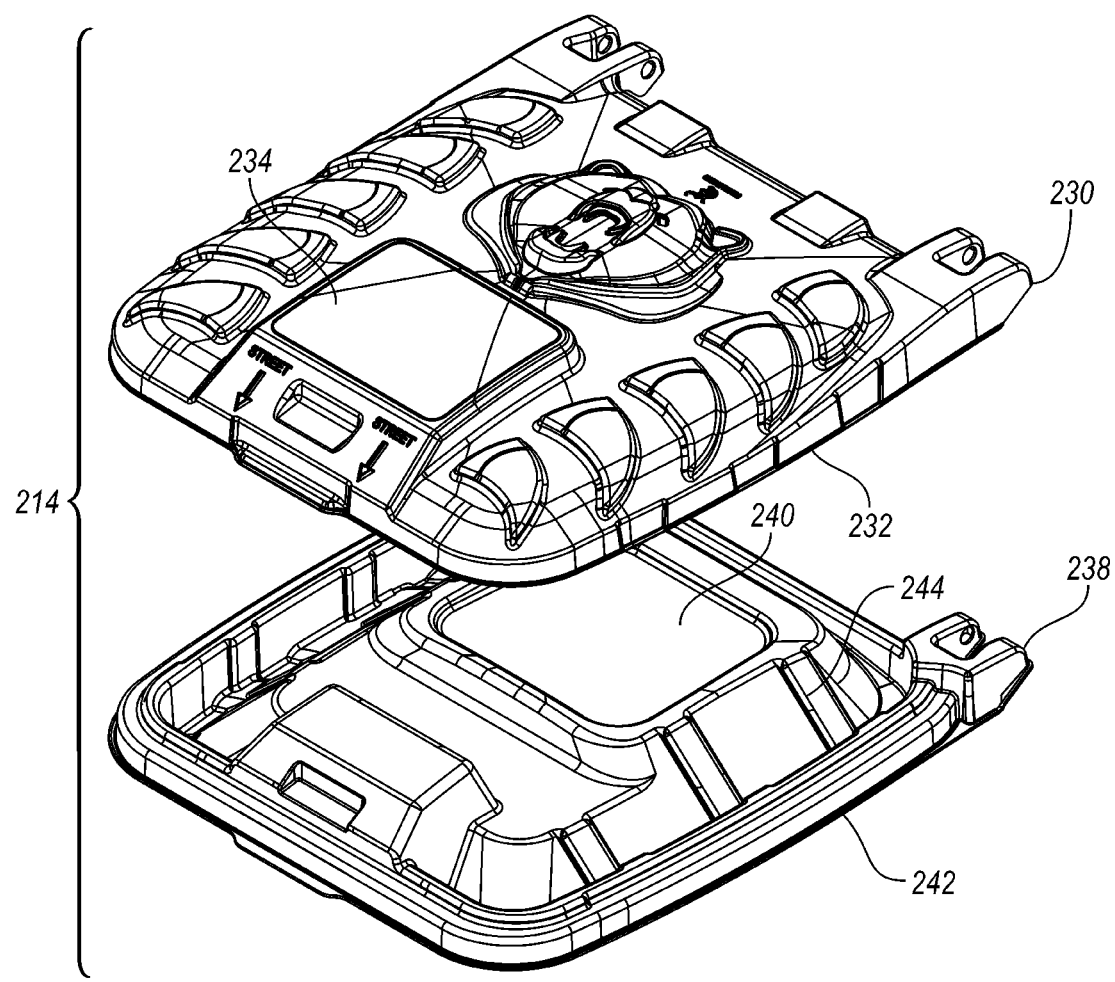
FIG. 31 is an exploded perspective view of the lid of the roll-out cart of FIG. 24.

As shown in FIG. 31, the lid 214 is initially formed in two pieces, upper lid portion 230 and lower lid portion 238. The upper lid portion 230 and lower lid portion 238 in this example are thermoformed and subsequently joined, but are shown in an exploded view in FIG. 31. The upper lid portion 230 includes an upper lip 232 extending downward from a periphery of an upper panel portion 234. The lower lid portion 238 includes a lower lip 242 extending downward from a periphery of a lower panel portion 244, which is convex upwardly and has a large upper planar portion 240.

Figure 32:
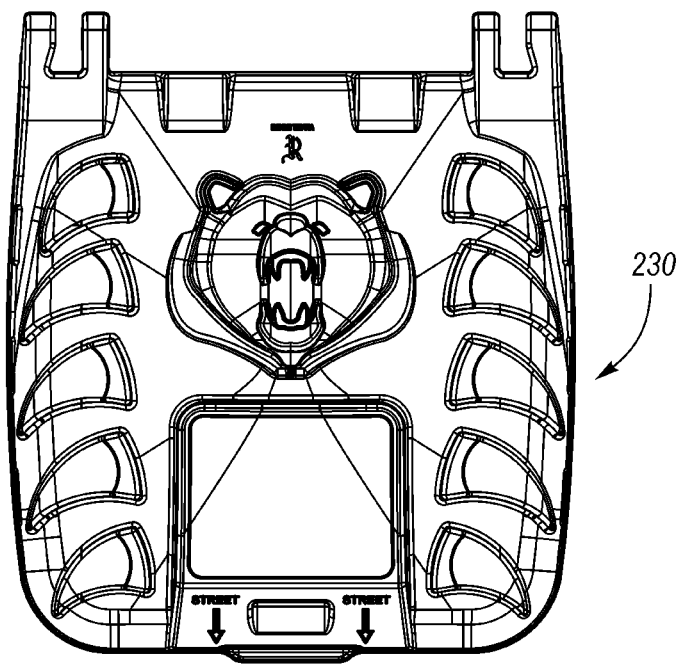
FIG. 32 is a top view of the lid of FIG. 31.
Figure 33:
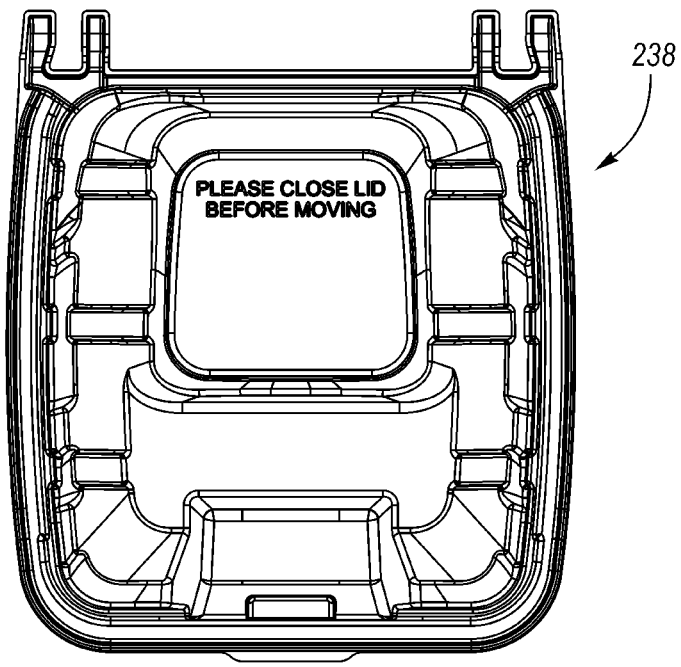
FIG. 33 is a bottom view of the lid of FIG. 31.

FIG. 32 is a top view of the upper lid portion 230. FIG. 33 is a bottom view of the lower lid portion 238.

Figure 34:
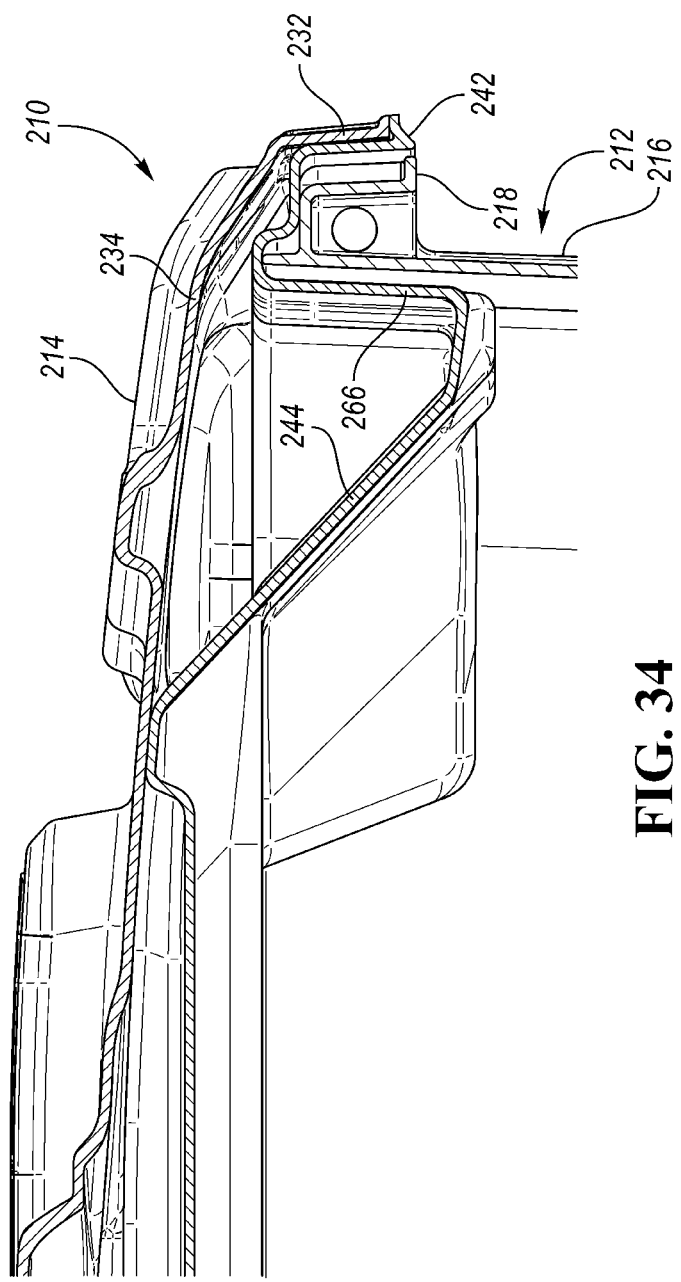
FIG. 34 is a section view through a portion of the lid of FIG. 31.

FIG. 34 is a section view taken through the side edge of the container 210. As shown in FIG. 34, the upper lid portion 230 and lower lid portion 238 are joined (e.g. via twin sheet thermoforming, adhesive, welding, fasteners, etc) to one another. The upper lid portion 230 and lower lid portion 238 connect (among other places) at the upper lip 232 and the lower lip 242. As shown, the lower lid portion 238 includes an inner lip 266 is spaced inward of the lower lip 242 to receive the upper end of the wall 216 of the body portion 212 and the lip 218 of the body portion 212 therebetween when the lid 214 is closed. The inner lip 266 extends about at least the front and sides of the lower lid portion 238 (also see FIG. 31). The upper lip 232 and lower lip 242 extend downward over the outside of the lip 218. The inner lip 266 extends downward along the inside of the upper portion of the wall 216 of the body portion 212. The lower panel portion 244 extends upward and inward from the bottom of the inner lip 266, creating a double-walled, hollow lip.

The upper lid portion 230 protects the interior of the body portion 212. The upper lip 232 of the upper lid portion 230 and the lower lip 242 of the lower lid portion 238 fit tightly around the outer perimeter of the upper portion of the wall 216 of the body portion 212 including the lip 218 when the lid 214 is closed. The tight fit makes it challenging for the bear to get its claws in-between the lid 214 and the body portion 212. The lower lid portion 238 is attached to the upper lid portion 230 on the interior of the lid 214. The lower lid portion 238 creates an added layer of protection to the lid 214 improving the overall strength. The lower lid portion 238, particularly the inner lip 266, also acts as a second barrier if the bear tries to pry the lid 214 open. When a bear pulls on the upper lip 232 and the lower lip 242, this pulls the inner lip 266 against the interior of the wall 216 and blocks off the entry point of the container 210. In other words, the more the lid 214 is flexed or warped, the more the lower lid portion 238, particularly the inner lip 266, seals against the inner surface of the body portion 212, both resisting deformation of the lid 214 and closing off any entry into the container 210.

Figure 35:
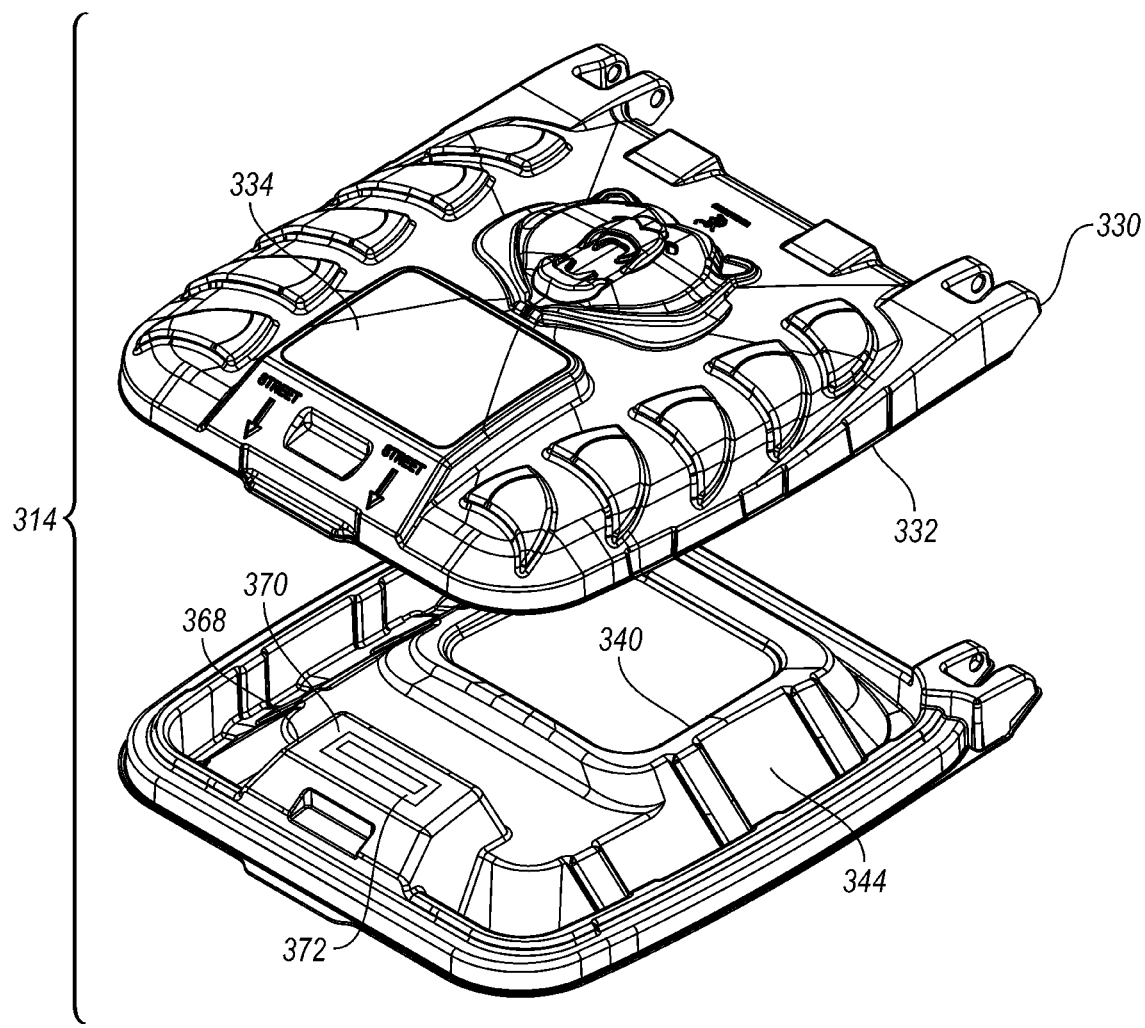
FIG. 35 is an exploded view of a lid according to a fourth embodiment.

An exploded view of an alternate lid 314 is shown in FIG. 35. The lid 314 is the same as the lid 214 of FIG. 31, with the addition of an RFID tag 372. The lid 314 includes upper lid portion 330 and lower lid portion 338. The upper lid portion 330 includes an upper lip 332 extending downward from a periphery of an upper panel portion 334. The lower lid portion 338 includes a lower lip 342 extending downward from a periphery of a lower panel portion 344, which is convex upwardly and has a large upper planar portion 340. The lower lid portion 338 also includes a front platform 368, which is higher than the periphery of the lower lid portion 338. The front platform 368 is adjacent a front edge of the lower lid portion 338 and includes an upper surface 370. The RFID tag 372 is positioned on the upper surface 370. The RFID tag 372 can be any available RFID tag, such as passive, active, battery-assisted, programmable, etc.

Figure 36:
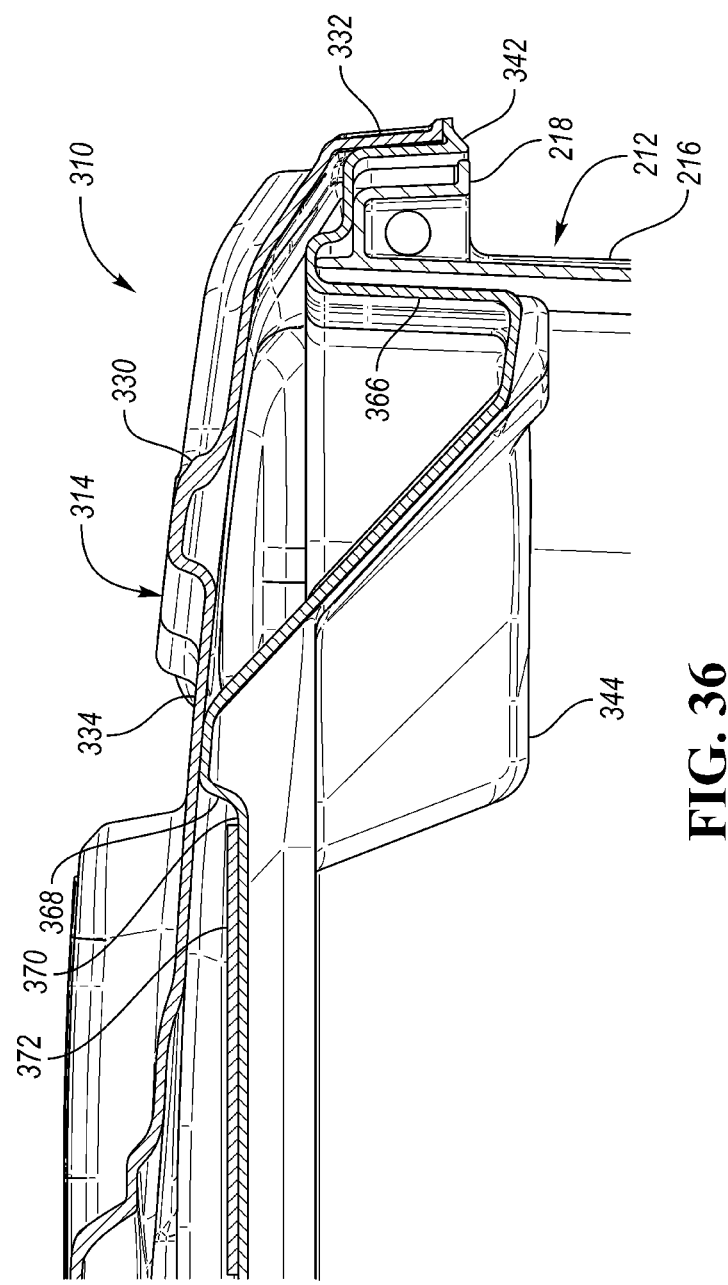
FIG. 36 is a section view through a portion of the lid of FIG. 35 on the body portion of a roll-out cart.

FIG. 36 is a section view taken through the side edge of the container 310. As shown in FIG. 36, the upper lid portion 330 and lower lid portion 338 are joined (e.g. via twin sheet thermoforming, or adhesive, welding, fasteners, etc) to one another. The upper lid portion 330 and lower lid portion 338 connect (among other places) at the upper lip 332 and the lower lip 342. As shown, the lower lid portion 338 includes an inner lip 366 that is spaced inward of the lower lip 342 apart to receive the upper end of the wall 216 of the body portion 212 and the lip 218 of the body portion 212 therebetween when the lid 314 is closed. The inner lip 366 extends about at least the front and sides of the lower lid portion 338 (also see FIG. 31). The upper lip 332 and lower lip 342 extend downward over the outside of the lip 218. The inner lip 366 extends downward along the inside of the upper portion of the wall 216 of the body portion 212. The lower panel portion 344 of the lower lid portion 338 extends upward from the inner lip 366 to the platform 368. The lower panel portion 344 extends upward and inward from the bottom of the inner lip 366, creating a double-walled, hollow lip. The RFID tag 372 is secured to the upper surface 370 of the platform 368, and is sealed between the lower lid portion 338 and upper lid portion 330. The RFID tag 372 is protected inside the lid 314 between the upper lid portion 330 and the lower lid portion 338, but can still be easily read by an RFID reader.

Figure 37:
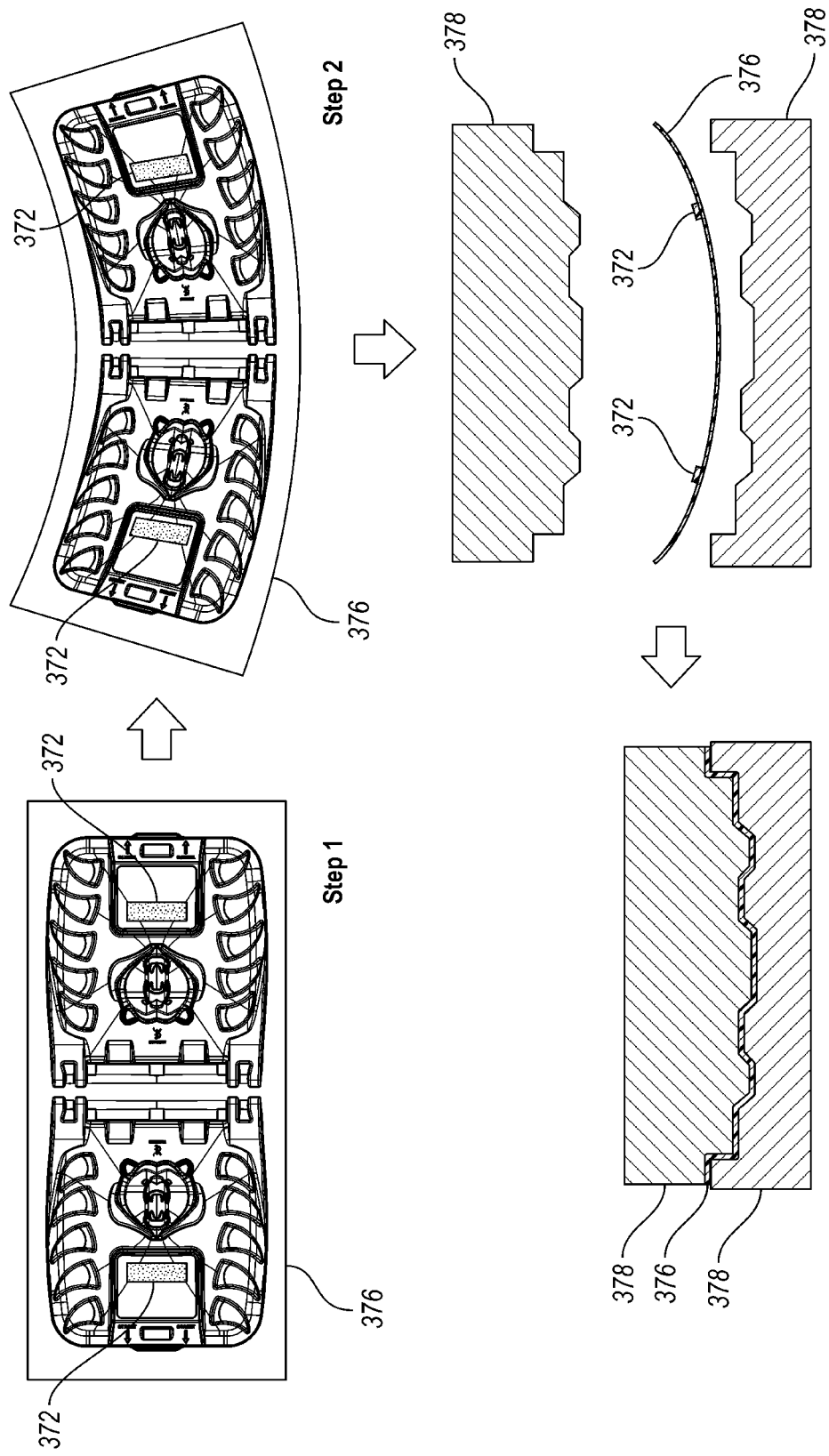
FIG. 37 shows steps 1-3 of a method of making the lid of FIG. 35.

FIG. 37 shows Steps 1-3 of a method of making the lid 314. In Step 1, RFID tags 372 are secured (such as by adhesive tape or glue) to a polymer sheet 376 (such as HDPE). In Step 2, the sheet 376 and RFID tags 372 are heated in an oven (e.g. at 375 degrees) for thermoforming process, which fuses the RFID tags 372 to the sheet 376.

In Step 3, the sheet 376 and RFID tags 372 undergo the thermoformed molding process on a bottom mold 380. The sheet 376 and RFID tags 72 may be formed between bottom mold 380 and top mold 378.

Figure 38:
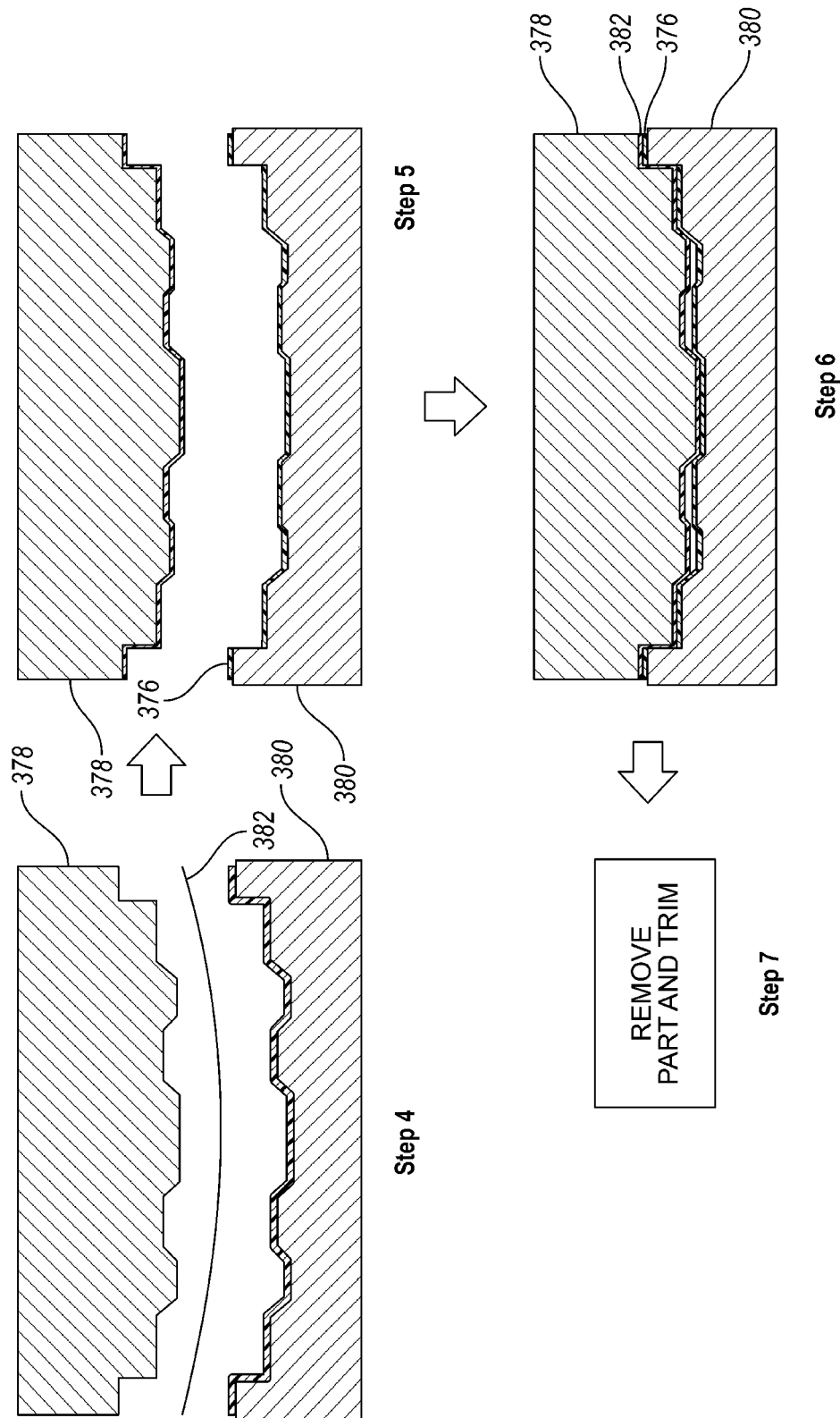
FIG. 38 shows steps 4-7 of a method of making the lid of FIG. 35.

FIG. 38 shows Steps 4-6 of the method. In Step 4, the top polymer sheet 382 (e.g. HDPE) is inserted into the mold between top mold 378 and the bottom sheet 376. In Step 5, the top sheet 382 is vacuum formed to the top mold 378. The mold halves 378, 380 are brought together and the sheets 382, 376 are fused to one another at multiple points. The RFID tags 372 are embedded inside the lid 314 inside hollow cavities between the sheets 382, 376. The lid 314 is removed from the mold and trimmed. The RFID tags 372 are now embedded inside each lid 314 and no longer visible on the exterior of the lid 314 but easily readable by an RFID reader.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method of making a container lid including:
   a) thermoforming an upper lid portion including thermoforming a first polymer sheet as the upper lid portion and forming a plurality of rearward projections for hingeably securing to a handle spaced rearwardly of a container;
   b) thermoforming a lower lid portion;
   c) placing an RFID tag between the upper lid portion and the lower lid portion; and
   d) securing the upper lid portion and the lower lid portion together.

2. The method of claim 1 wherein step a) further includes forming an upper lip projecting downward from a periphery of an upper panel portion of the upper lid portion and wherein step b) further includes forming a lower lip projecting downward from a periphery of a lower panel portion of the lower lid portion.

3. The method of claim 2 wherein step d) further includes joining the upper lip to the lower lip.

4. The method of claim 2 wherein step d) further includes joining the upper lip to the lower lip via twin sheet thermoforming, adhesive, or welding.

5. The method of claim 2 wherein step b) further includes forming a double-walled hollow inner lip spaced inward of the lower lip.

6. The method of claim 1 wherein step b) includes thermoforming a second polymer sheet as the lower lid portion.

7. The method of claim 1 further including placing the RFID tag on the lower lid portion before step b).

8. A method of making a container lid including:
a) thermoforming an upper lid portion including forming an upper lip projecting downward from a periphery of an upper panel portion of the upper lid portion;
b) thermoforming a lower lid portion including forming a lower lip projecting downward from a periphery of a lower panel portion of the lower lid portion and forming a platform higher than the periphery of the lower panel portion of the lower lid portion:
c) placing an RFID tag between the upper lid portion and the lower lid portion, wherein the platform is spaced below the upper lid portion, and wherein the RFID tag is positioned on the platform; and
d) securing the upper lid portion and the lower lid portion together.

9. A method of making a container lid including:
a) thermoforming a first polymer sheet into an upper lid portion having an upper lip projecting downward from a periphery of the upper lid portion;
b) thermoforming a second polymer sheet into a lower lid portion, including forming in the second polymer sheet a lower lip and a double-walled hollow inner lip spaced inward of the lower lip, wherein the lower lip projects downward from a periphery of a lower panel portion of the lower lid portion, wherein the double-walled hollow inner lip extends about at least a front edge and opposed side edges of the lower lid portion; and
c) securing the upper lid portion and the lower lid portion together.

10. The method of claim 9 wherein step c) includes joining the upper lip of the first polymer sheet to the lower lip of the second polymer sheet.

11. The method of claim 10 further including:
d) joining the upper lip to the lower lip via twin sheet thermoforming, adhesive, or welding.

12. The method of claim 9 wherein step b) further includes forming in the second polymer sheet a platform higher than a periphery of the lower lid portion.

13. The method of claim 9 further including placing an RFID tag on the lower lid portion before step b).

14. A method of making a container lid including:
a) forming an upper lid portion including forming an upper lip projecting downward from a periphery of the upper lid portion;
b) forming a lower lid portion having a lower lip projecting downward at a periphery of a lower panel portion of the lower lid portion, including forming a double-walled hollow inner lip spaced inward of the lower lip, wherein the double-walled hollow inner lip extends downward further than the lower lip; and
c) joining the upper lid portion to the lower lid portion via twin sheet thermoforming, adhesive, or welding.

15. The method of claim 14 wherein step c) includes joining the upper lip to the lower lip.

16. The method of claim 15 wherein step c) includes joining the upper lip to the lower lip via twin sheet thermoforming, adhesive, or welding.

17. The method of claim 16 wherein step b) further includes forming a platform higher than a periphery of the lower lid portion.

18. The method of claim 14 wherein step b) includes forming the lower lid portion and the lower lip from a single sheet of plastic, and wherein step b) further includes forming the double-walled hollow inner lip from the single sheet of plastic.

19. The method of claim 14 wherein step b) further includes forming a platform higher than the periphery of the lower panel portion of the lower lid portion.

20. The method of claim 19 further including placing an RFID tag on the platform prior to step c).

21. The method of claim 20 wherein after step c), the platform is spaced downwardly away from the upper lid portion.

22. The method of claim 14 wherein step a) includes forming a first polymer sheet as the upper lid portion including the upper lip and wherein step b) includes forming a second polymer sheet as the lower lid portion including the lower lip.

23. The method of claim 22 wherein step a) includes forming a plurality of rearward projections for hingeably securing to a handle spaced rearwardly of a container.

24. A method of making a container lid including:
a) thermoforming a first polymer sheet into an upper lid portion having an upper lip projecting downward from a periphery of the upper lid portion;
wherein step a) includes forming a plurality of rearward projections for hingeably securing to a handle spaced rearwardly of a container;
b) thermoforming a second polymer sheet into a lower lid portion, including forming in the second polymer sheet a lower lip and a double-walled hollow inner lip spaced inward of the lower lip, wherein the double-walled hollow inner lip extends about at least a front edge and opposed side edges of the lower lid portion; and
c) securing the upper lid portion and the lower lid portion together.

25. A method of making a container lid including:
a) thermoforming an upper lid portion;
b) thermoforming a lower lid portion, including forming a lower lip projecting downward from a periphery of the lower lid portion and forming a double-walled hollow inner lip spaced inward of the lower lip and extending downward further than the lower lip;
c) placing an RFID tag between the upper lid portion and the lower lid portion; and
d) securing the upper lid portion and the lower lid portion together.

26. The method of claim 25 wherein the double-walled hollow inner lip extends about at least a front edge and opposed side edges of the lower lid portion.

* * * * *